April 13, 1965     E. W. OVESON     3,177,717
INDOOR-OUTDOOR THERMOMETER
Filed June 12, 1962
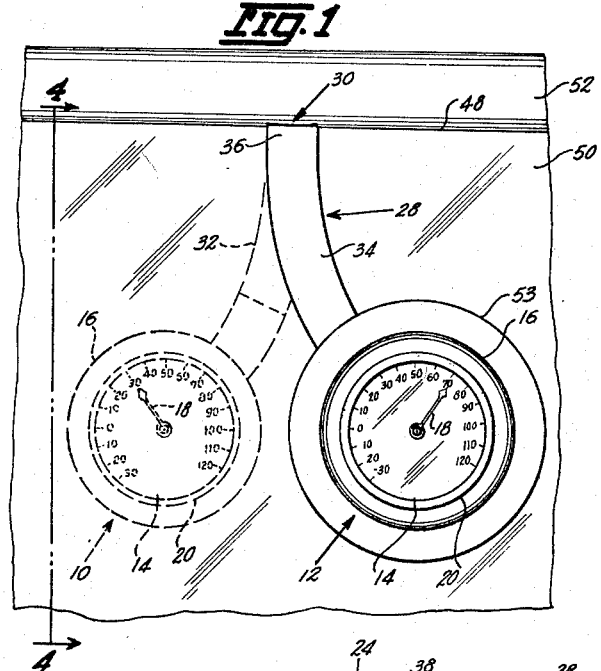
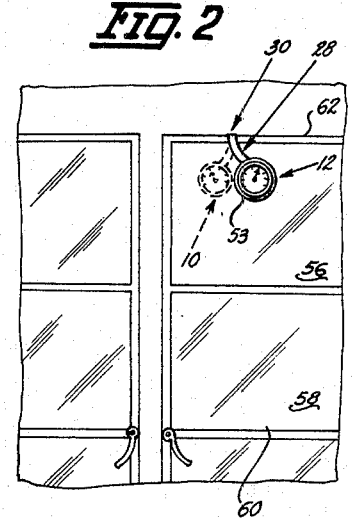
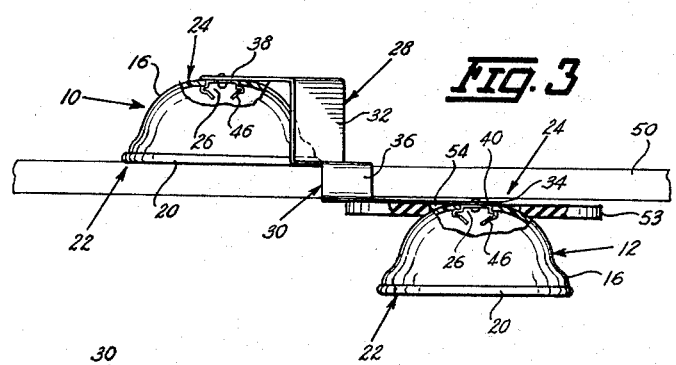
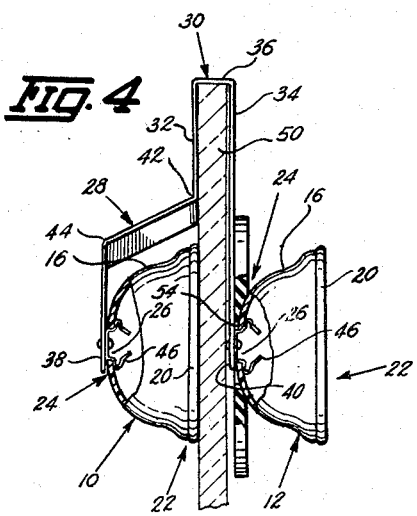
INVENTOR.
EUGENE W. OVESON
BY *Morton S. Adler*
ATTORNEY.

United States Patent Office 3,177,717
Patented Apr. 13, 1965

3,177,717
INDOOR-OUTDOOR THERMOMETER
Eugene W. Oveson, 3609 Bel Aire Road,
Des Moines, Iowa
Filed June 12, 1962, Ser. No. 201,868
9 Claims. (Cl. 73—340)

This invention relates ot temperature indicating devices and more particularly to a novel and useful indoor-outdoor thermometer that has special utility in automotive vehicles although it may also be used in buildings and the like.

Many types of indoor-outdoor thermometers have heretofore been made, and while they represent widely varying forms and constructions, they appear to have a common characteristic in the embodiment of plural temperature reading scales mounted on a generally unitary base for disposition indoors and with more or less complicated forms of remote temperature sensing elements located outdoors and connected to one of the reading scales.

In this invention I have departed from the prevalent characteristic indicated above and one of the important objects contemplated herein is the provision of plural independent thermometers carried by a single mounting member which in turn is designed to be supported by the top edge of vehicle window, or the top frame portion of a building window, in such a manner that one thermometer is positioned on the outer side of the window and one is positioned on the inner side thereof.

Another object inherent herein is the provision of plural thermometers of the above class wherein both are in lateral close proximity to each other and both are readable from the inner or indoor side of the window.

A further feature of this invention includes the mounting of both thermometers in abutting contact with the window and with insulation means provided for protecting the indoor thermometer from being affected by any transfer of cold air through the window.

Still another object is to provide an indoor-outdoor thermometer as above characterized which can be easily mounted to or removed from a supporting window or window frame.

To attain these objects and such further objects as may appear herein, or be hereinafter pointed out, reference is made to the accompanying drawings forming a part hereof, in which:

FIG. 1 is a front elevational view of this invention showing the same mounted to the top edge of a vehicle window, FIG. 2 is a reduced view similar to FIG. 1 but showing the invention mounted to the top edge of a casement type building window, FIG. 3 is a top view, partly in section of the device shown in FIG. 1, and FIG. 4 is a side view taken from the line 4—4 of FIG. 1.

Referring to the drawings a pair of like but independent thermometer units are designated generally by the numerals 10 and 12 for use respectively in outdoor and indoor locations. No invention is claimed in such thermometers per se, it being sufficient only that they be of any suitable construction to indicate the temperature in the location where they are mounted. Thus, thermometers of various types that are commercially available may be used in accordance with the description that follows.

In the embodiment of this invention illustrated in the drawings like numerals will be given to like parts for members 10 and 12 wherever applicable. Preferably I have used thermometers which have a suitably calibrated round flat face or dial 14 that is mounted to a more or less semispherical housing 16. Thermometers 10 and 12 are of the type having a bi-metal spring type mechanism (not shown) for effecting movement of needle 18 in a well known manner but, as indicated above, other forms of thermometers such as the bulb type, for example, may be employed if desired. A flat transparent cover of glass, plastic or the like 20 is mounted to the front side 22 of housing 16 to protect dial 14. The rear side 24 of housing 16 is provided with a central opening 26 for use in attaching such housing to a support as will later appear.

Both thermometers 10 and 12 are mounted to a unitary support member, designated generally by the numeral 28, which comprises a resilient clip member preferably formed of elongated strap-like material bent at substantially its central portion 30 to form the two clip arms 32 and 34 that initially extend from bend 30 in parallel spaced relationship for a relatively short distance to define a support engaging clip portion 36 and then diverge to terminate in the respective ends 38 and 40. The length of arm 34 including end 40 is substantially planar while arm 32 is further bent 42 (FIG. 4) outwardly from clip portion 36 and way from arm 34 and bent again at 44 to extend downwardly to end 38. By this arrangement, ends 38 and 40 are not only laterally spaced when viewed from the front or rear as is apparent in FIGS. 1 and 3 but they are similarly disposed when viewed from the side as shown in FIG. 4.

Each end 38 and 40 of support member 28 carries a resilient clip 46 as shown in FIG. 4 for a snap fit engagement in opening 26 of the respective housings 16 whereby thermometers 10 and 12 are adequately supported for use as follows. Clip portion 36 is adapted for a removal frictional snap fit to the top edge 48 of a window 50 as may be found in a motor vehicle or the like, represented only by the fragmentary vehicle structure at 52, it being understood that window 50 is shown in a partially lowered position and is susceptible of being further lowered or completely closed in a well known manner.

In the mounting of member 28 to a window 50 to be supported thereby, arm 32 is placed at the outdoor side of the window and arm 34 will be adjacent the indoor side thereof. Thus arranged it will be noted that arm 32, by reason of the bends 42 and 44, is sufficiently spaced from window 50 so that the cover 20 of the outdoor thermometer 10 is supported in abutting contact with the outer side of the window and the dial 14 thereon is clearly visible from the inside of the window. Since end 40, adjacent the indoor side of window 50, is secured to the rear side 24 of housing 16 for the indoor thermometer 12, and since such thermometer would thus be susceptible to being affected by the transfer of cold through window 50 so as to produce an inaccurate indoor temperature reading, I have mounted an insulating disc-shaped member 53 to the rear of housing 16 for thermometer 12 so that it is intermediate the window and such thermometer and in abutting contact with the window. Such disc 53 may be provided with a central opening 54 through which clip 46 is passed before being engaged in opening 26 on the housing for thermometer 12 so as to securely hold disc 53 in place as described.

It will be appreciated from the foregoing description that this is a most convenient and efficient device for observing simultaneously the indoor-outdoor temperatures from selected openable windows in a motor vehicle and can be a very desirable instrument, for example, in noting the effectiveness of a car air-conditioning unit. Since both thermometers are independent self-contained instruments, no remote sensing elements or structure is necessary as each instrument is entirely located in the area of temperature environment where the temperature reading is desired and each instrument is clearly and easily readable from the same location at an indoor position. The indoor thermometer 12 is fully protected from being affected by outdoor or temperatures by disc 53 and the outdoor thermometer 10 is supported flush against the outer side of window 50 sufficiently tight enough from the spring action of clip member 28 that snow, rain or sleet will not normally infiltrate between cover 20 of thermometer 10 and the outer side of window 50 so as to interfere with the visibility of dial 14 from the inside.

With reference to FIG. 2, the thermometers 10 and 12 and related parts above described are shown being used on a casement window structure which includes the glass windows 56 and 58 in a supporting frame 60. Clip 28 may be attached to the top edge 62 of frame 60 in the same manner as to window 50 previously described, and since clip 28 is made from relatively thin but sturdy material, it will not interfere with the proper fitting of frame 60 within its usual window opening structure. FIGS. 1 and 2 are thus only illustrative of two applications for this indoor-outdoor thermometer and it will be appreciated that it can be easily adapted for use with various other forms of window structures without departing from the principle here disclosed.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

I claim:

1. An indoor-outdoor thermometer device comprising:
   (a) a pair of independent self contained thermometer members each having visible temperature indicating indicia thereon,
   (b) a unitary support member secured to said thermometer members so as to maintain them in spaced and non-planar relationship and with the temperature indicating indicia disposed in the same direction, and
   (c) means for attaching said support member over the edge of window structure so that one of said thermometer members is disposed on one side of the window structure and the other thermometer member is disposed on the opposite side thereof with the temperature indicating indicia on both thermometer members being visible from the same side of said window structure.

2. An indoor-outdoor thermometer device comprising:
   (a) a pair of independent self contained thermometer members each having visible temperature indicating indicia thereon,
   (b) a unitary support member secured to said thermometer members so as to maintain them in spaced and non-planar relationship and with the temperature indicating indicia disposed in the same direction,
   (c) means mounting said support member for attachment to a window structure where such window structure has an outer side exposed to the outdoor atmosphere and an inner side exposed to an indoor area,
   (d) one of said thermometer members being disposed at the outer side of said window structure and the other being disposed at the inner side thereof, and
   (e) the temperature indicating indicia on both thermometer members being visible from the inner side of said window structure.

3. An indoor-outdoor thermometer device comprising:
   (a) a pair of independent self contained thermometer members each having visible temperature indicating indicia thereon,
   (b) a single mounting member for supporting said thermometer members in spaced and non-planar relationship and with the temperature indicating indicia disposed in the same direction,
   (c) means for attaching said mounting member to a window structure where such window structure has an outer side exposed to the outdoor atmosphere and an inner side exposed to an indoor area,
   (d) one of said thermometer members being disposed in abutting contact with the outer side of said window structure and the other being disposed closely adjacent the inner side thereof,
   (e) insulation means intermediate said other thermometer member and the inner side of the window structure, and
   (f) the temperature indicating indicia on both thermometer members being visible from the inner side of said window structure.

4. An indoor-outdoor thermometer device comprising:
   (a) a pair of independent self contained thermometer members each having visible temperature indicating indicia thereon,
   (b) a resilient clip having diverging arms terminating in a spaced and non-planar relationship,
   (c) each arm secured to one of said thermometer members, and
   (d) said clip adapted for frictionally straddling the top edge of an openable vehicle window so that said thermometer members are respectively disposed at opposite sides of the window and the temperature indicating indicia on both thermometer members is visible from the same side of the window.

5. An indoor-outdoor thermometer device comprising:
   (a) a pair of independent self contained thermometer members each having visible temperature indicating indicia thereon,
   (b) a resilient clip having diverging arms terminating in a spaced and non-planar relationship,
   (c) each arm secured to one of said thermometer members, and
   (d) said clip adapted for frictionally straddling an edge of a window structure so that said thermometer members are respectively disposed at opposite sides of the window and the temperature indiciating indicia on both thermometer members is visible from the same side of the window.

6. An indoor-outdoor thermometer device comprising:
   (a) a pair of independent self contained thermometer member each including a housing with a front and rear side, a flat transparent cover on said front side, temperature measuring apparatus in said housing and temperature indicating indicia visible through said cover,
   (b) a single mounting member secured to the rear side of each housing to maintain them in spaced and non-planar relationship and with said covers disposed in the same direction,
   (c) means for attaching said mounting member to a window structure where such window structure has an outer side exposed to the outdoor atmosphere and an inner side exposed to an indoor area,
   (d) the cover of one of said thermometer members being disposed in abutting contact with the outer side of the window structure and the rear end of the other thermometer member being disposed closely adjacent the inner side thereof,
   (e) insulation means intermediate the rear end of said other thermometer member and the inner side of said window structure, and
   (f) the temperature indicating indicia on both thermometer members being visible from the inner side of said window structure.

7. An indoor-outdoor thermometer device comprising:
   (a) a pair of independent self contained thermometer member each including a housing with a front and rear side, a flat transparent cover on said front side, temperature measuring apparatus in said housing and temperature indicating indicia visible through said cover, (b) an elongated strap-like resilient member bent intermediate its ends to form a clip portion from which integral arms diverge and terminate in a spaced non-planar relationship, (c) means on the free end of each arm attached to the respective rear ends of said housings, and (d) said clip portion adapted for frictionally straddling the edge portion of a window so that said thermometer members are respectively disposed at opposite sides of the window and the temperature indicating indicia on both thermometer members is visible from the same side of the window.

8. An indoor-outdoor thermometer device comprising:
(a) a pair of independent self contained thermometer members, and
(b) a single support means carrying both of said thermometer members in spaced non-planar relationship and including means for mounting said support means relative to a window member so that said thermometer members are respectively disposed at opposite sides of said window member.

9. An indoor-outdoor thermometer device comprising:
(a) a pair of independent self-contained thermometer members each having visible temperature indicating indicia thereon,
(b) an elongated strap-like resilient member bent intermediate its ends to form a clip portion from which integral arms diverge and terminate in a spaced non-planar relationship,
(c) a friction clip on the free end of each arm,
(d) means on each thermometer member to frictionally receive one of said clips so as to be supported thereby, and
(e) said clip portion adapted for frictionally straddling the edge portion of a window so that said thermometer members are respectively disposed at opposite sides of the window and the temperature indicating indicia on both thermometer members is visible from the same side of the window.

References Cited by the Examiner
UNITED STATES PATENTS

| | | | |
|---|---|---|---|
| 1,605,466 | 11/26 | Roedell | 73—378 |
| 1,691,136 | 11/28 | Schlaich | 73—340 |
| 2,067,016 | 1/37 | Packer | 73—378 |
| 2,117,012 | 5/38 | Whittier | 73—343 |

ISAAC LISANN, *Primary Examiner.*

L. R. PRINCE, *Examiner.*